United States Patent [19]
Ou

[11] Patent Number: 5,322,860

[45] Date of Patent: Jun. 21, 1994

[54] ELASTIC PERMEABLE MATERIAL AND METHOD OF MAKING SAME

[76] Inventor: Jer-Wen Ou, No. 231, Cheng Kung 3rd Road, Nantou City, Taiwan

[21] Appl. No.: 139,838

[22] Filed: Oct. 22, 1993

Related U.S. Application Data

[62] Division of Ser. No. 5,388, Jan. 15, 1993.

[51] Int. Cl.⁵ .................. B29C 67/00; B29C 67/20
[52] U.S. Cl. .................. 521/54; 264/46.4; 264/46.6; 264/139; 264/321
[58] Field of Search .......... 264/46.4, 46.6, 139, 264/321; 521/54; 428/316.6, 314.4, 71, 322.7, 320.2

[56] References Cited

U.S. PATENT DOCUMENTS

| | | | |
|---|---|---|---|
| 2,772,196 | 5/1954 | Pooley | 428/314.8 |
| 3,043,731 | 7/1962 | Hill | 428/316.6 |
| 3,503,840 | 3/1970 | Parrish | 428/320.2 |
| 3,839,080 | 10/1974 | Jarema et al. | 428/308.4 |
| 4,379,856 | 4/1983 | Samaritter et al. | 428/316.6 |
| 4,618,532 | 10/1986 | Volland et al. | 428/71 |
| 4,627,179 | 12/1986 | McElroy | 428/314.8 |
| 4,651,445 | 3/1987 | Hannibal | 428/316.6 |
| 4,686,130 | 8/1987 | Kon | 428/71 |
| 4,755,411 | 7/1988 | Wing et al. | 428/316.6 |
| 4,769,278 | 9/1988 | Kamimura et al. | 428/316.6 |
| 5,130,176 | 7/1992 | Baerveldt | 428/322.7 |

*Primary Examiner*—George F. Lesmes
*Assistant Examiner*—Blaine Copenheaver
*Attorney, Agent, or Firm*—Browdy and Neimark

[57] ABSTRACT

An elastic permeable material and method of making same involves a board-like basic structure made of a foam material having therein close cells. The basic structure is provided with a plurality of recesses which are filled with an emulsified foam body having therein open cells. The basic structure is subjected to a heating and then a curing before the top and the bottom layers of the basic structure are peeled off so that the recesses become through holes. The basic structure is used as a main framework while the foam bodies embedded in the through holes form a permeable framework. The elastic permeable material is provided thereon a permeable outer covering adhered thereto. The basic structure is heated under a pressure so as to bring about a reduction in the thickness of the basic structure, thereby resulting in a formation of corrugated surface of the elastic permeable material.

13 Claims, 3 Drawing Sheets

ELASTIC PERMEABLE MATERIAL AND METHOD OF MAKING SAME

This is a division of copending parent application Ser. No. 08/005,388, filed Jan. 15, 1993.

FIELD OF THE INVENTION

The present invention relates to a foam material, and more particularly to an elastic permeable material and a method of making the same.

BACKGROUND OF THE INVENTION

The conventional cotton foam material is composed of open cells and is therefore soft and permeable; nevertheless it has a rather weak structural framework, thereby making it vulnerable to deformation under pressure. Such conventional cotton foam material can not be processed to form an object of a predetermined shape. In any event, the application of such cotton foam material as described above is rather limited even if the cotton foam material is made into something similar to a board, which is then cut into pieces having specified sizes. In fact, the basic structural framework of a board made of cotton foam material is such that the board can not be used to form an object under heat and pressure. There is another kind of foam material, which is composed of closed cells and is therefore structurally stronger than the cotton foam material. However, this foam material above is limited due to its impermeability.

SUMMARY OF THE INVENTION

It is therefore the primary objective of the present invention to provide an elastic permeable material, which can be used to make an object by molding.

It is another objective of the present invention to provide a simplified and cost effective method of making the above-mentioned elastic permeable material.

In keeping with the principles of the present invention, the foregoing objectives of the present invention are attained by an elastic permeable material and a method of making the same. According to the present invention, a foam material having closed cells is used to make a flat boardlike basic structure provided with a plurality of through holes, each of which is filled with a foam material having open cells. The basic structure is used as a main supporting component of the structural framework of the elastic permeable material while the foam material having open cells is used to provide the elastic permeable material with excellent permeability.

DETAILED DESCRIPTION OF THE PREFERRED EMBODIMENTS

Referring to FIGS. 1-7, a method of making a permeable shoe pad 40 of the first preferred embodiment of the present invention is shown to comprise the following steps.

Figure 1:
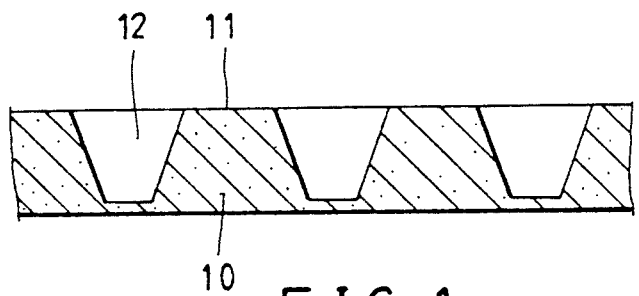
FIG. 1 shows a schematic view of a basic structure of a first preferred embodiment of the present invention.

(a) As shown in FIG. 1, flat basic structure 10 made of ethylene vinyl acetate by injection molding or die foaming is provided with a top surface 11 having a plurality of recesses 12 of a trapezoidal construction which have progressively smaller cross-sectional area in the direction away from the top surface.

Figure 2:
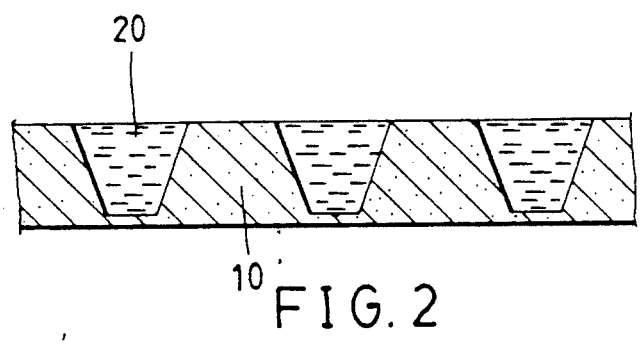
FIG. 2 is a schematic view showing that a tapered recess of the basic structure of the first preferred embodiment, as shown in FIG. 1, is filled with an emulsified foam body.

(b) As shown in FIG. 2, the recesses 12 of the basic structure 10 are filled with a foam rubber material or an emulsified foam body 20.

Figure 3:
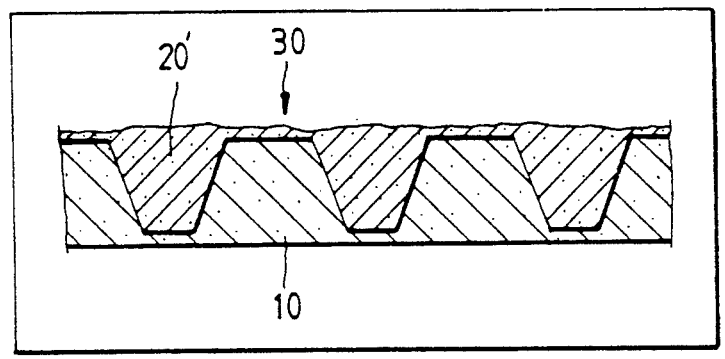
FIG. 3 is a schematic view showing that the basic structure of the first preferred embodiment of the present invention, as shown in FIG. 2, is baked in an oven.

(c) As shown in FIG. 3, the basic structure 10 filled with a foam rubber material or an emulsified polyvinyl chloride foam body 20 is baked in an oven the foam rubber material or the emulsified PVC foam body 20 to becoming sulfurized or gelatinized.

Figure 4:
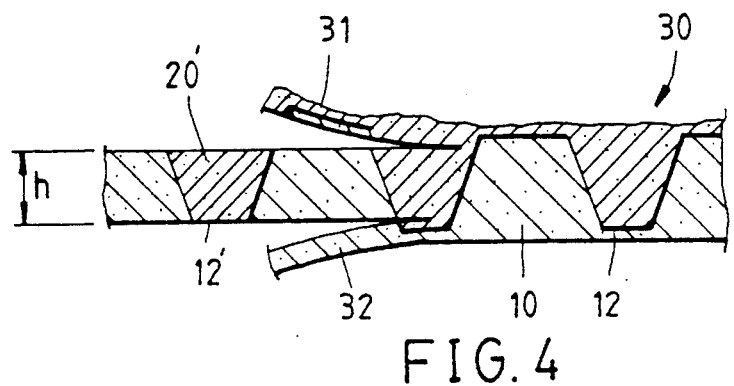
FIG. 4 is a schematic view showing a top and bottom layer of the baked basic structure being peeled off.

(d) As shown in FIG. 4, the sulfurized or gelatinized basic structure 30 has a top layer 31 and a bottom layer 32, which are peeled off so that the recesses 12 of the basic structure 10 form through holes 12'. The sulfurized or gelatinized foam body 20 forms a permeable body 20' having open cells in through hole 12'.

Figure 5:
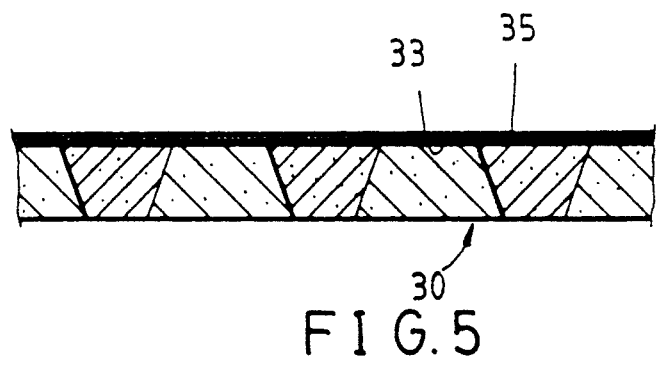
FIG. 5 is a schematic view showing that an outer covering is adhered to the peeled basic structure as shown in FIG. 4.

(e) As shown in FIG. 5, the sulfurized or gelatinized basic structure 30 has a top surface 33 with an outer covering 35 of a permeable material adhered thereto.

Figure 6:
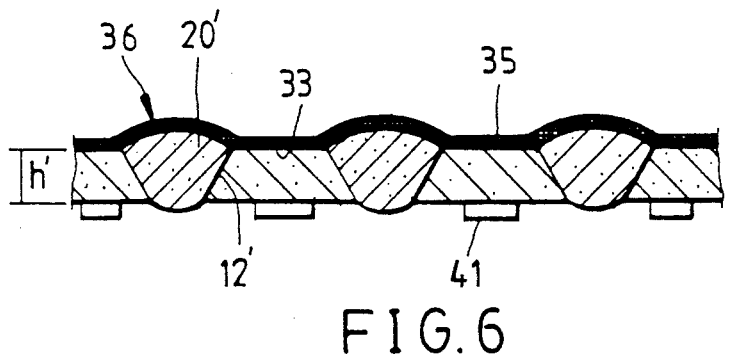
FIG. 6 is a schematic view showing that the basic structure having thereon an outer covering, as shown in FIG. 5, is subjected to heat under an exerted pressure which cause the basic structure to compress and to bring about a plurality of arcuate protuberances of permeable material.
Figure 7:
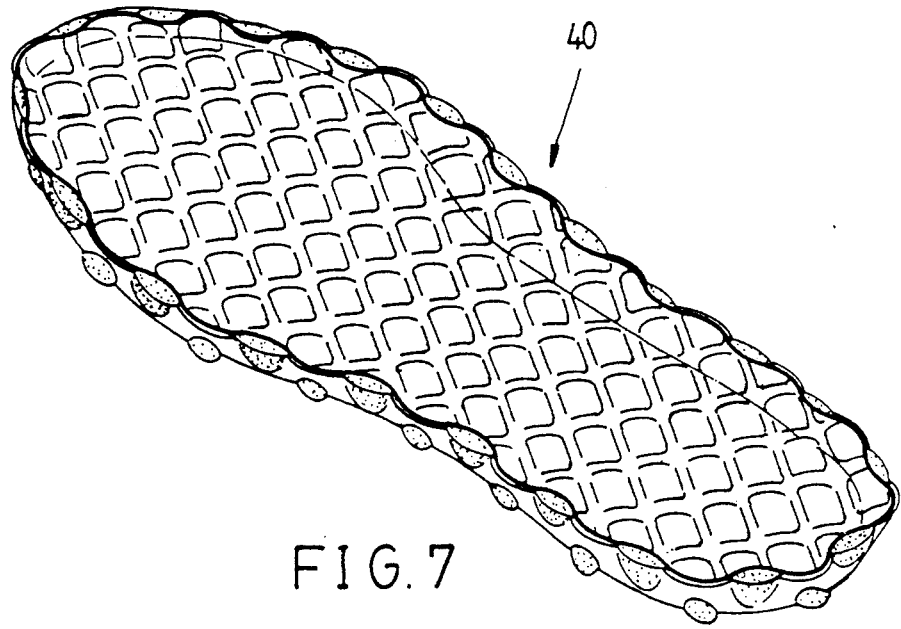
FIG. 7 is a schematic view showing that the compressed basic structure, as shown in FIG. 6, is cut to form a shoe pad.

(f) As shown in FIG. 6, the sulfurized or gelatinized basic structure 30 having an outer covering 35 is arranged in molding tool, which is then subjected to an exerted heat under a pressure causing the basic structure 10 to compress from a thickness h to a thickness h'. However, upon being removed from the molding tool, the sulfurized or gelatinized permeable body 20' is restored to its original volume to force the top surface 33 to bulge, and thereby resulting in the formation of an arcuate protuberance 36 by the outer covering 35. In other words, the arcuate protuberance 36 is formed at the wider end of each trapezoidal through holes 12'. The permeable shoe pad 40 so formed has a plurality of ribs 41 (or grooves) located on the bottom surface thereof for enhancing exhaustion. (g) As shown in FIG. 7, the shoe pad 40 is cut to a specified size.

It must be noted here that ethylene vinyl acetate material may be used to make a thick basic structure 10 by foaming in step (a). The thick basic structure 10 is then cut to a predetermined thickness before being arranged in a molding tool where the basic structure 10 forms recesses 12 under heat and exerted pressure.

A method of making a material 50 of the second preferred embodiment of the present invention comprises the following steps.

Figure 8:
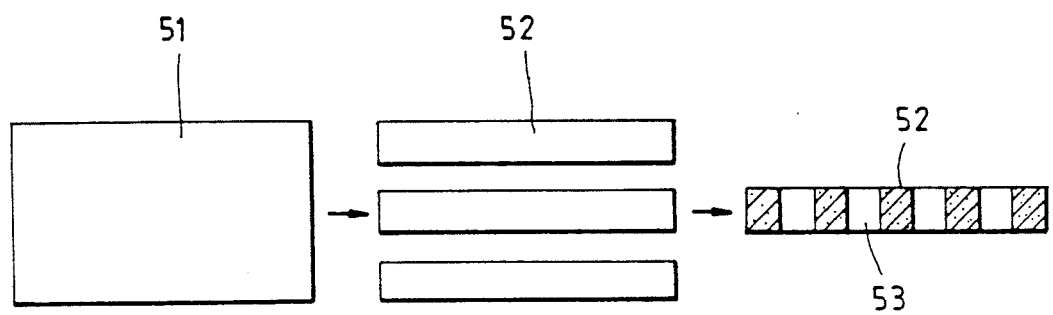
FIG. 8 is a schematic view showing the manufacture of a basic structure of a second preferred embodiment of the present invention.

(a) As shown in FIG. 8, a thick board 51 made of foamed ethylene vinyl acetate material is cut to provide a board piece 52 having a predetermined thickness. The board piece 52, is made of a basic structure having a plurality of closed cells punched to form a plurality of through holes 53.

Figure 9:
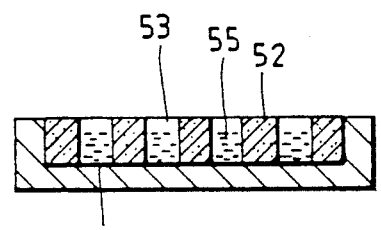
FIG. 9 is a schematic view showing that the basic structure, as shown in FIG. 8, is provided with holes filled with liquid polyurethane.

(b) As shown in FIG. 9, the board piece 52 (the basic structure) is arranged in a mold cavity 54. Each of the through holes 53 of the board piece 52 is filled with a predetermined quantity of liquid polyurethane 55.

Figure 10:
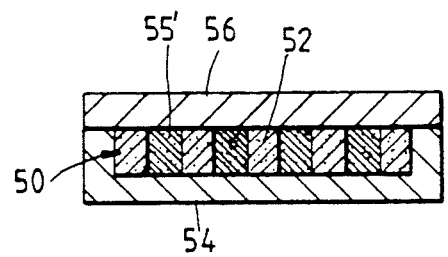
FIG. 10 is a schematic view showing that the basic structure filled with liquid PU, as shown in FIG. 9, is subjected to heat under an exerted pressure so as to foam.

(c) As shown in FIG. 10, the mold cavity 54 is covered with a top mold 56. The molding tool containing the board piece 52 is heated under an exerted pressure as to cause the polyurethane material 55 to take shape by foaming and to fillings the through holes 53.

(d) Molding tool referred to in the step (c) is allowed to cool before being opened to remove the material 50. This material has a plurality of closed cells which form a foam basic structure 52 provided with through holes 53, each of which is filled with a foam permeable material 55' having open cells.

The material 50 embodied in the second preferred embodiment of the present invention may be peeled and then adhered to an outer covering. The material 50 may be also heated under an exerted pressure causing the foam basic structure 52 to become thin and the foam permeable material 55' to bulge. This process is similar to the method described for the first preferred embodiment of the present invention.

The elastic permeable material of the present invention is composed of a foam elastic material having closed cells which form the basic structure construction that serves to strengthen the structural framework of the elastic permeable material. The netlike basic structure of the elastic permeable material of the present invention is further provided with foam permeable material having open cells. This results in the elastic permeable material of the present invention being elastic, permeable, and resistant to deformation and breakage. In addition, the elastic permeable material of the present invention can be molded under heat and an exerted pressure to form a predetermined shape. As a result, the elastic permeable material of the present invention may be used to make an inner construction for a chair, a mattress, or a protective mat, etc. Moreover, the elastic permeable material of the present invention may be peeled and then adhered to an outer covering for use as a permeable covering for a floor mat, a chair, a mattress, or a protective mat, etc. The elastic permeable material of the present invention may be heated under an exerted pressure causing its basic structure to become thin and so a plurality of arcuate protuberances to be formed on the surface of the elastic permeable material of the present invention. This elastic permeable material may be used to make a shoe pad, or a seat, or a mattress, etc.

What is claimed is:

1. A method of making an elastic permeable material comprising the steps of:
    (a) providing a flat board-like foam material, which has closed cells and a body provided with a plurality of recesses;
    (b) filling said recesses with an emulsified rubber foam body or an emulsified polyvinyl chloride foam body;
    (c) sulfurizing said emulsified rubber foam body or said emulsified polyvinyl chloride foam body to form a permeable material having open cells; and
    (d) removing a bottom layer of said basic structure so that said recesses become through holes.

2. The method according to claim 1 further comprising beyond said step (d) the steps of:
    (e) removing a top layer of said basic structure and an excess of said permeable material; and
    (f) adhering a permeable outer covering to a top surface of said basic structure.

3. The method according to claim 1 wherein each of said recesses of said basic structure is trapezoidal in shape and has a top opening with a diameter greater than a diameter of a bottom of said each of said recesses.

4. The method according to claim 3 wherein said basic structure of a thickness is subjected to a molding under a heat and a pressure to bring about a reduction in said thickness of said basic structure so that a permeable material is caused to form a protuberance over said top opening of said each of said recesses.

5. The method according to claim 1 wherein said basic structure is made of an ethylene vinyl acetate material by foaming.

6. The method according to claim 1 wherein said basic structure is a thick board made of an ethylene vinyl acetate material by foaming and is cleaved to have a predetermined thickness before said basic structure is arranged in a molding tool in which said basic structure is heated under a pressure so as to form therein said recesses.

7. A method of making an elastic permeable material comprising the steps of:
    (a) using an ethylene vinyl acetate material to make by foaming a thick board, which is cleaved to form a board piece which has a predetermined thickness and which is punched to form a basic structure having a plurality of through holes;
    (b) arranging said basic structure in a mold cavity of a molding tool and then filling said through holes of said basic structure with liquid polyurethane;
    (c) closing said molding tool, which is then heated under a pressure to cause said polyurethane to foam; and
    (d) removing from said molding tool an elastic permeable material so made.

8. The method according to claim 7 wherein said elastic permeable material is peeled upon completion of said step (d).

9. The method according to claim 8 wherein said elastic permeable material is adhered thereto an outer covering of a permeable material upon completion of the peeling of said elastic permeable material.

10. The method according to claim 9 wherein said elastic permeable material having thereon said outer covering is heated under a pressure so that said basic structure is reduced in thickness so as to bring about the foaming of said polyurethane to form a protuberance over each of said through holes.

11. A method of making an elastic permeable sheet material comprising the steps of:
    providing a sheet of closed cellular elastic foam material;
    making holes in said sheet of closed cellular elastic foam material so as to provide recesses therewithin;

filling said recesses with a foamable elastomeric composition capable of forming open cell foam; and foaming and solidifying said foamable elastomeric composition to provide an open cell permeable foam within said recesses, wherein said open cell permeable foam extends entirely through said sheet of closed cellular elastic foam.

12. A method according to claim 11, wherein the step of making holes provides recesses which extend entirely through said sheet of closed cellular elastic foam.

13. A method according to claim 11, wherein said recesses do not originally extend entirely through said sheet of closed cellular elastic foam, and further comprising a subsequent step of removing a bottom layer of said sheet of closed cellular elastic foam so that said open cell permeable foam filled recesses extend entirely through said sheet of closed cellular elastic foam.

* * * * *